Patented May 29, 1951

2,555,169

UNITED STATES PATENT OFFICE 2,555,169

STABILIZED COMPOSITIONS CONTAINING HIGH MOLECULAR WEIGHT HALOGENATED MATERIALS

Heino Tonnis Voorthuis, Amsterdam, Netherlands, assignor to Shell Development Company, San Francisco, Calif., a corporation of Delaware No Drawing. Application February 7, 1950, Serial No. 142,945. In the Netherlands June 24, 1949

8 Claims. (Cl. 260—45.8)

This invention relates to a new composition of matter containing a high molecular weight halogenated organic material and a stabilizer therefor which inhibits or prevents the deteriorating effects of heat and light. More particularly, the invention is concerned with a composition containing a polymer of vinyl chloride in admixture with an especially effective stabilizer.

Halogen-containing organic materials of high molecular weight such as polymers and copolymers of vinyl chloride are usually fabricated into useful articles by use of heat in milling and/or molding operations. However, these fabricating operations employing heat tend to decompose the halogen-containing material so that it becomes discolored as well as stiffens and loses pliability. Moreover, exposure of the halogen-containing material to light, especially sunlight which is rich in ultraviolet radiation, also causes discoloration as well as softening and surface pitting of the halogen-containing material.

It has been proposed heretofore to stabilize such halogen-containing organic substances by incorporation therewith of glycidyl aryl ethers such as glycidyl phenyl ether or glycidyl naphthyl ether. However, these aromatic ethers themselves tend to decompose rather quickly under the influence of light with the result that their stabilizing effect is soon lost. It has now been discovered that by using a compound which is devoid of aromatic groups, unexpectedly superior stabilization is obtained. According to the present invention, discoloration and deterioration of halogen-containing organic materials of high molecular weight induced by the action of heat and/or light are suppressed or prevented by incorporation therewith of a small proportion of an epoxy-alkyl diether of a polyalkylene glycol. This stabilizer compound meets the severe requirements necessary for satisfactory stabilization of the halogen-containing organic substances. It is sufficiently high boiling that loss thereof from the composition by volatilization is nil. The compound in being devoid of aromatic groups is itself stable against decomposition by the action of light. Besides the stabilizing action achieved by the presence of the glycide groups in the molecule, the several ether oxygen atoms appear to add some additional stabilizing action. Moreover, the compound is not irritant to the human skin as is the case with some aromatic glycidyl ethers. This last property is of great importance in application, for example, of stabilized polyvinyl chloride compositions employed as wristwatch bands.

The high molecular weight halogen-containing material, which is the principal constituent of the composition, may be any substance containing an appreciable proportion of halogen and a molecular weigh of at least 2000. No particular upper limit to the molecular weight is necessary to realize the advantages of the invention so long as it is above about 2000. The stabilization is obtained with the halogen-containing organic materials having molecular weights of about 10,000, 25,000, 50,000, 100,000, 150,000 or higher. While it is preferred to employ the principle of the invention for the purpose of stabilizing chlorine-containing organic materials, substances containing other halogens such as bromine, fluorine or iodine are also suitable. In general, the halogen atom or atoms are linked directly to a carbon atom which in turn is linked to no other atoms than carbon, hydrogen or other halogen atoms which may be the same or different from the first. Among the materials stabilized, are polyvinyl chloride, after-chlorinated polyvinyl chloride, copolymers of vinyl chloride with various polymerizable compounds containing olefinic double bonds such as vinyl acetate, vinyl chloride, acrylonitrile, maleic anhydride, styrene, etc.; halogenated polyolefins such as chlorinated polyethylene, brominated polyisobutylene, etc.; polymers of chloroprene as well as copolymers thereof with other polymerizable unsaturated compounds such as those named above; halogenated products of fats, train oils, waxes, and the high-boiling hydrocarbons and the like. In general, the stabilizing influence is particularly suitable with substances containing at least 10% halogen, particularly those with up to 75% halogen. Excellent results have been obtained upon stabilizing polyvinyl chloride as well as copolymers of vinyl chloride with up to 15% vinyl actate. Especially suitable are copolymers of vinyl chloride and vinyl acetate containing about 85% to 96% vinyl chloride.

The compound employed to stabilize the composition is a polyalkylene glycol ether having the hydrogen atom of each hydroxyl group of the glycol substituted with an epoxy-alkyl radical wherein the epoxy group is a three membered ring. In other words, the epoxy-alkyl radical is a glycide-substituted alkyl group having the epoxy oxygen atom linked directly to adjacent or vicinal carbon atoms in the alkyl chain and with at least one saturated carbon atom intervening between the glycide ring and the ether oxygen atom to which the epoxy-alkyl radical is attached. It is preferred that the epoxy-alkyl radicals in the compound contain up to 6 carbon atoms although it is not necessary that there be any particular upper limit to the number of carbon atoms. In the compounds, the two epoxy-alkyl radicals may be identical or different.

The diglycidyl diethers of a polyalkylene glycol constitute a preferred class of stabilizer compounds. These may be represented by the formula

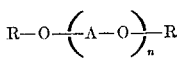

wherein R is a glycidyl radical, A is an alkylene radical, and $n$ is any integer of at least 2, preferably of 2 to 4. The plurality of alkylene radicals contained in the compound are the same or different either with respect to structural configuration or number of carbon atoms or both. While it is preferred that the alkylene groups contain up to 6 carbon atoms, no particular upper limit to the number is essential. However, owing to the commercial availability of polyethylene glycols, a particularly preferred class of stabilizer compounds are represented by the diglycidyl diethers of polyethylene glycol, especially diethylene glycol and triethylene glycol.

The following are representative of the compounds employed in the composition of the invention, but it is to be understood that the stabilizer compounds are not to be deemed limited to the examples herein: diglycidyl diethers of diethylene glycol, triethylene glycol, tetraethylene glycol, hexaethylene glycol, dipropylene glycol, tripropylene glycol, dibutylene glycol, diisobutylene glycol, dihexylene glycol, mixed ethylene-propylene glycol, mixed ethylene-butylene glycol, and mixed ethylene-propylene-isobutylene glycol, as well as the corresponding 2,3-epoxybutyl, 3,4-epoxybutyl, 2-methyl-2,3-epoxypropyl, 2,3-epoxypentyl, 4-methyl-3,4-epoxypentyl, 2-methyl-2,3-epoxypentyl, 2,3-epoxyoctyl, 2-methyl-2,3-epoxyoctyl, or 2,3-epoxydecyl diethers of the above-mentioned glycols.

The epoxy-alkyl ethers can be obtained by reacting the polyalkylene glycol with the appropriate chloride or bromide of an epoxy-alkane in the presence of an alkali and in an anhydrous medium. In effecting the reaction, it is preferable to employ an excess of the chloride or bromide, use powdered potassium hydroxide as the alkali, and operate at temperatures of about 30° C. to 40° C. Good results are also obtained by first fusing together stoichiometrical quantities of the polyalkylene glycol and solid sodium hydroxide. The glycolate thus formed is then crushed and added to the chloride or bromide of the epoxy-alkane for reaction therewith at about 30° C. to 40° C. which forms the desired epoxy-alkyl ether. In those cases where chloride or bromide of the epoxy-alkane and/or the formed epoxy-alkyl ether is a solid at this preferred operating temperature, the reaction mixture may be rendered fluid by employing dioxane as solvent therein.

The diglycidyl ethers may also be obtained by a different method wherein the polyalkylene glycol is reacted with epichlorohydrin in the presence of about 0.1% to 2% of boron trifluoride at about 30° C. to 35° C. whereby the chlorohydrin ether is formed as product. The chlorohydrin ether is then dehydrochlorinated to the desired glycidyl ether with a small, say 10% stoichiometrical excess of base such as a concentrated aqueous solution of sodium hydroxide.

In preparing the composition of the invention, the stabilizer is incorporated into the halogen-containing material by any of the methods known in the art for compounding resin compositions. Thus, the stabilizer may be milled into halogen-containing resins on a heated roll mill, be introduced along with solvents which are later evaporated along with the stabilized composition, or be incorporated into an aqueous emulsion or latex of halogen-containing material which is later deposited and fused. In general, the stabilizer is incorporated as uniformly as possible with the substance to be stabilized.

The proportion of stabilizer employed in admixture with the high molecular weight halogen-containing organic materials may be varied in order to meet the stabilizing requirements needed for the composition. Although the optimum proportion is dependent upon the substance to be stabilized, the particular ether utilized as stabilizer and the demands finally required to be made on the stabilized composition, the proportion is, in general, a substantial amount such as from 0.5% to 5% by weight. Excellent results are obtained with an added 1% to 3%.

Other substances are often incorporated with the compositions of the invention to assist their utility such as solvents like hydrocarbons and/or ketones; pigments like lampblack, titanium dioxide, or lead chromate; plasticizers like dibutyl phthalate, tricresyl phosphate or dioctyl phthalate; and other stabilizers like polyglycidyl ethers of polyhydric phenols, organic tin compounds or metal salts.

The following example is given solely for the purpose of illustrating the specific embodiment of the invention.

*Example.—Preparation of diglycidyl diether of diethylene glycol*

Diethylene glycol in amount of 1.00 mol was mixed with 2.00 mols of solid sodium hydroxide and the mixture was heated to the fusion point (about 120° C.). After cooling, the product was crushed to a powder and added to 4.00 mols of epichlorhydrin. The reaction mixture thus obtained was agitated for about 5½ hours while keeping the temperature at about 35° C. to 40° C. by cooling. Sodium chloride was then filtered off and the desired diglycidyl ether recovered from the filtrate by distillation.

*Stabilization of polyvinyl chloride*

Compositions consisting of 100 parts by weight of polyvinyl chloride having a molecular weight of about 100,000, 40 parts by weight of di-(ethyl-2-hexyl) phthalate and 2 parts by weight of the stabilizer compound noted in the table below were prepared on a heated roll mill. The thin foils were rolled at a temperature of 155° C. for 10 minutes. The foils had a uniform thickness of 1.2 mm.

The foils were kept for specific periods in an oven containing air at a temperature of 160° C. The color of the foils was then determined with incident light, color slides from the Lovibond tintometer being used as a basis for comparison. The results are summarized in the table below:

| Stabilizer | Color of Foils After Heating For— | | | |
|---|---|---|---|---|
| | 15 min. | 30 min. | 45 min. | 60 min. |
| None | 3.5 | >30 | | |
| Glycidyl 1-naphthyl ether | 4.1 | 6.2 | >30 | |
| Diglycidyl diether of diethylene glycol | 4.0 | 5.8 | 8.3 | 12 |

I claim as my invention:

1. A composition of matter comprising a halogen-containing organic substance having a molecular weight above 2000 in admixture with a substantial amount of a polyalkylene glycol ether having the hydrogen atom of each hydroxyl group of said glycol substituted with an epoxy-alkyl radical wherein the epoxy group is a three-membered ring and at least one saturated carbon atom intervenes between the glycide ring and the ether oxygen atom, the amount being sufficient to retard deterioration of the composition by action of heat and light.

2. A composition of matter comprising an organic substance having a molecular weight above 2000 and containing 10% to 75% of halogen in admixture with an added 0.5% to 5% of a compound of the formula

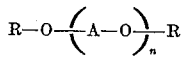

wherein R is a glycidyl radical, A is an alkylene radical, and $n$ is an integer of at least 2.

3. A composition of matter comprising a polymer of vinyl chloride with a molecular weight above 2000 containing at least 10% chlorine in admixture with an added 0.5% to 5% of a compound of the formula

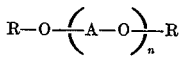

wherein R is a glycidyl radical, A is an alkylene radical of up to 6 carbon atoms, and $n$ is an integer of 2 to 4.

4. A composition of matter comprising polyvinyl chloride with a molecular weight above 2000 in admixture with an added 0.5% to 5% of a diglycidyl diether of polyethylene glycol.

5. A composition of matter comprising polyvinyl chloride with a molecular weight above 2000 in admixture with an added 1% to 3% of diglycidyl diether of diethylene glycol.

6. A composition of matter comprising polyvinyl chloride with a molecular weight above 2000 in admixture with an added 1% to 5% of diglycidyl diether of triethylene glycol.

7. A composition of matter comprising a polymer of vinyl chloride with up to 15% of vinyl acetate having a molecular weight above 2000 in admixture with an added 0.5% to 5% of a diglycidyl diether of polyethylene glycol.

8. A composition of matter comprising a copolymer of vinyl chloride and vinyl acetate containing about 85% to 96% vinyl chloride and having a molecular weight above 2000 in admixture with an added 1% to 3% of diglycidyl diether of diethylene glycol.

HEINO TONNIS VOORTHUIS.

REFERENCES CITED

The following references are of record in the file of this patent:

UNITED STATES PATENTS

| Number | Name | Date |
|---|---|---|
| 2,166,604 | Meyer | July 18, 1939 |